Sept. 22, 1953
R. C. LACY
2,652,750
MILLING FIXTURE
Filed Feb. 17, 1949
4 Sheets-Sheet 1
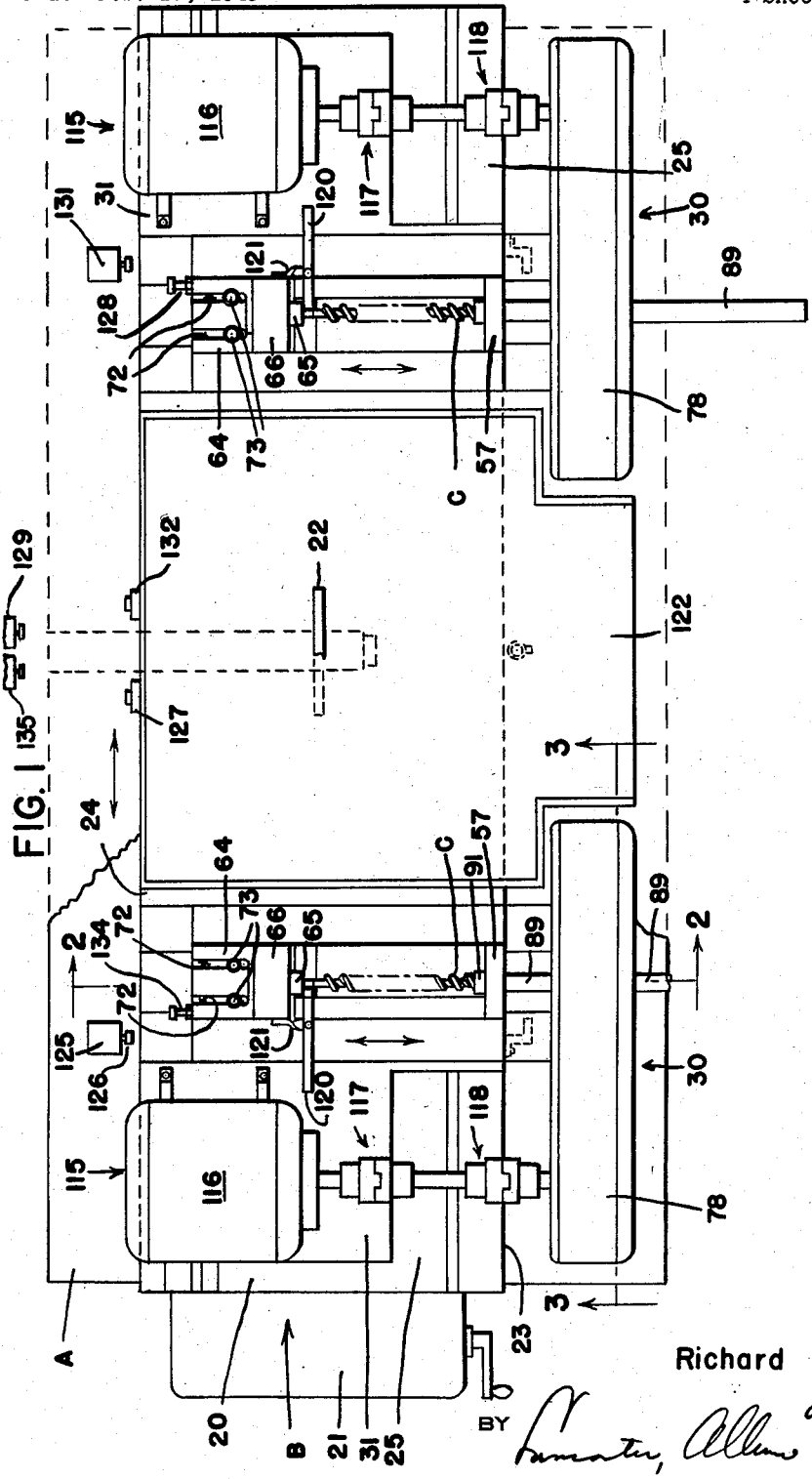
INVENTOR.
Richard C. Lacy
BY
ATTORNEYS.

Sept. 22, 1953  R. C. LACY  2,652,750
MILLING FIXTURE
Filed Feb. 17, 1949  4 Sheets-Sheet 2
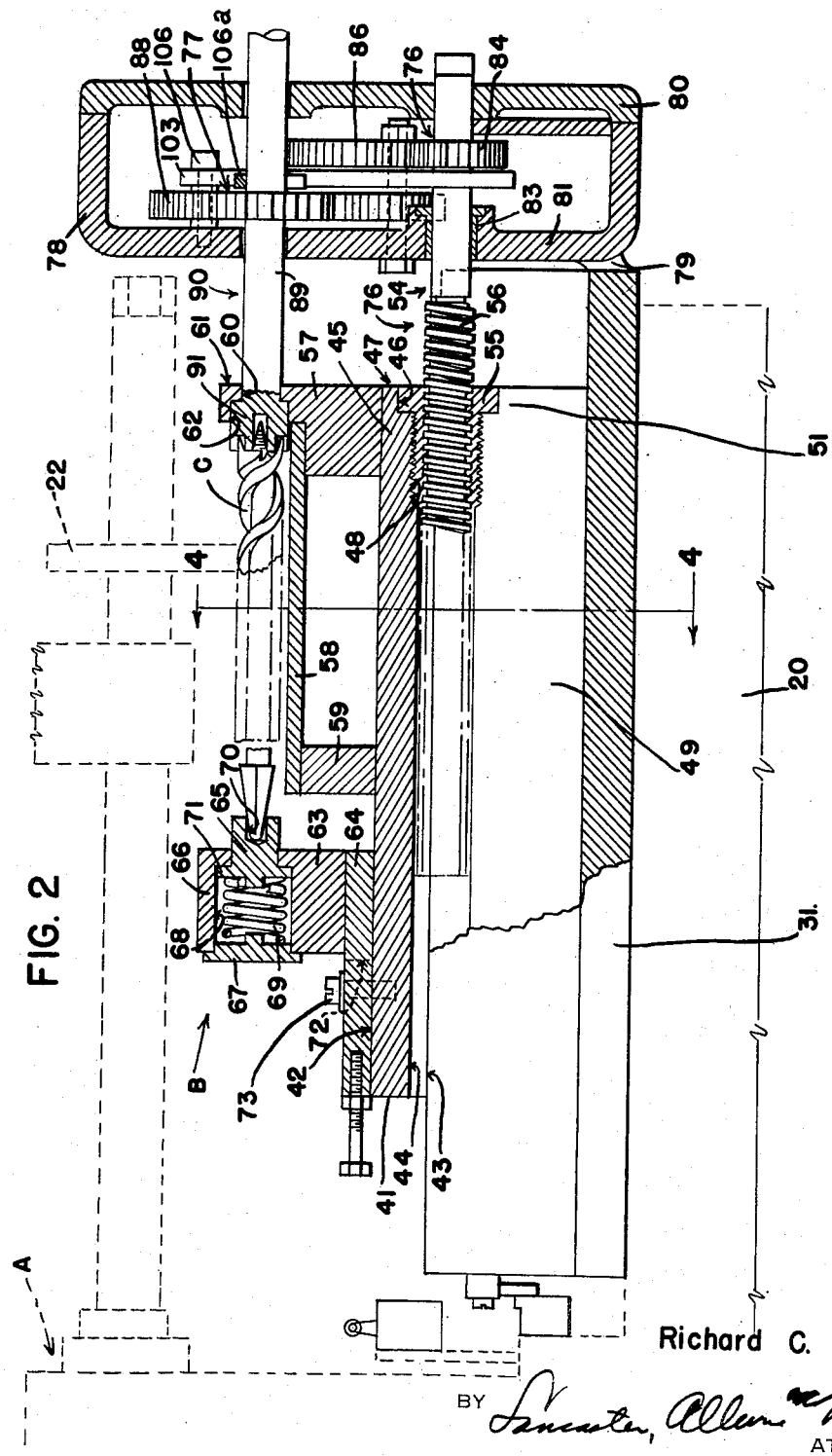
INVENTOR.
Richard C. Lacy
BY Lancaster, Allen & Romuel
ATTORNEYS.

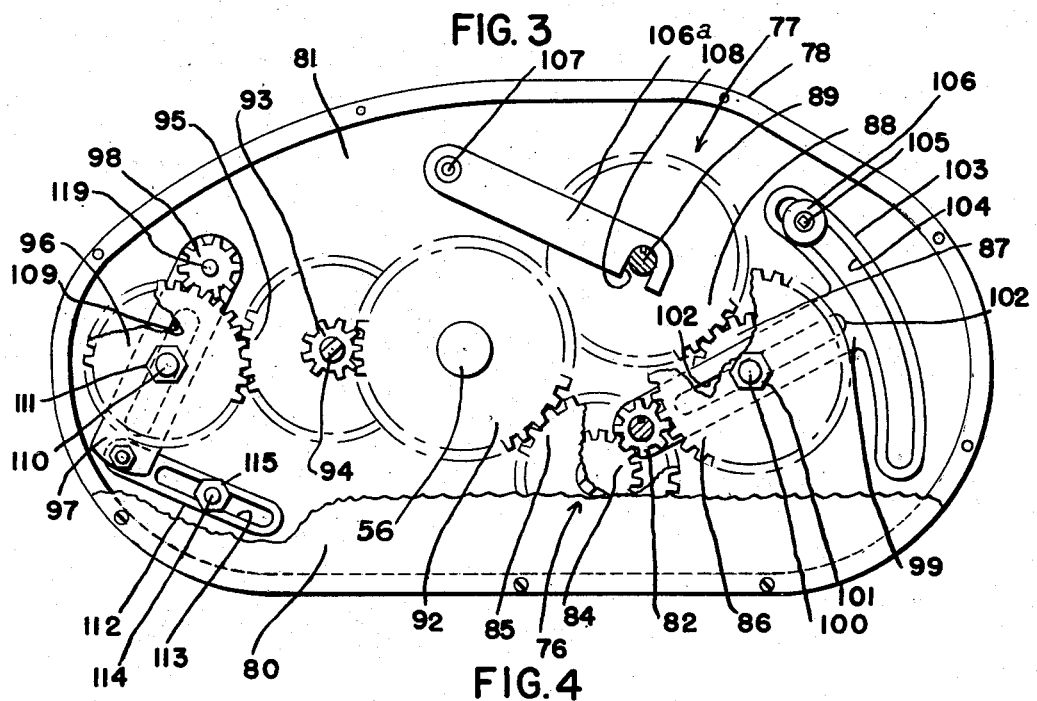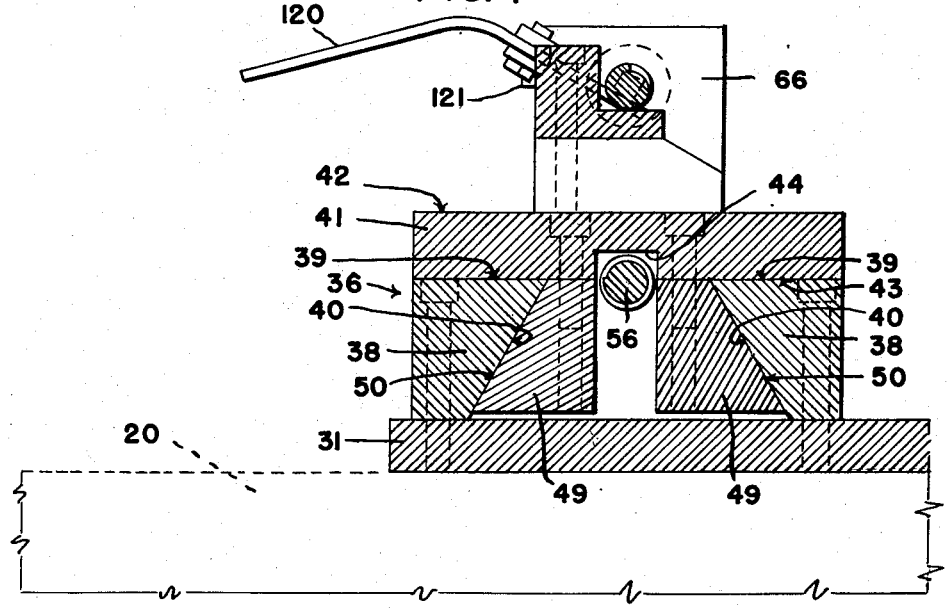

Sept. 22, 1953          R. C. LACY          2,652,750
MILLING FIXTURE

Filed Feb. 17, 1949                                  4 Sheets-Sheet 4

INVENTOR.
Richard C. Lacy
BY *Lancaster, Allwine and Rommel*
ATTORNEYS.

Patented Sept. 22, 1953

2,652,750

UNITED STATES PATENT OFFICE 2,652,750

MILLING FIXTURE

Richard C. Lacy, Wilmington, Ohio, assignor to The Irwin Auger Bit Company, Wilmington, Ohio, a corporation of Ohio Application February 17, 1949, Serial No. 76,935

9 Claims. (Cl. 90—11.62)

This invention relates to milling fixtures for milling machines.

More specifically, it relates to a milling fixture which may be employed as an auger bit jig milling attachment for a milling machine provided with a hydraulically-operated actuating mechanism for operation of a reciprocating table so as to alternatingly position workpieces in line with a single non-reciprocatory cutter.

An important object of the invention is to provide a milling fixture which will move one workpiece (as a bit blank) in a path for milling while the operator is loading the fixture with a second workpiece (as another bit blank) and, as the milling of the first workpiece is completed, it will be returned to the operator for removal and a third workpiece will be loaded by him in its place, as the second workpiece is being milled.

Another important object is to provide carrier means for advancing and rotating a workpiece in a path so as to be milled by a non-longitudinally-advancing rotary cutter, as a like carrier means is stationary for loading with a second workpiece, preparatory to advancement and rotation in the same path as the first.

Still another important object is to provide means for rotating and advancing a workpiece in a fixed straight path so as to be milled by a rotating, non-longitudinally-advancing cutter and, after milling is completed, rotating the milled workpiece in the opposite direction and retracting the same.

A further important object is to provide a milling fixture as described which requires the services of but one operator, since the table, in association with the novel fixture, moves the milled workpieces, one after another, to the operator who needs but unload them and reload the empty carriers, one after another, with workpieces.

Yet another important object is to provide means by which, as the workpiece is carried into position for milling to commence, the workpiece is caused to rotate and advance until it is milled, whereupon another means causes reversal of the direction of rotation of the milled workpiece as well as retraction thereof, still another means stops rotation and retraction of the milled workpiece as the latter reaches the desired point of retraction and, before another workpiece is positioned (after removal of the milled workpiece) for milling, the direction of rotation and reciprocation is reversed, so that the new workpiece may be positioned for milling.

Furthermore, an important object of the invention is to provide means by which, as the cutter finishes milling of the workpiece, the rotation of the workpiece will cease, the workpiece carried out of the path of the cutter and rotation of the milled workpiece will be reversed and retraction will commence.

Further object include the provision of electrically-operated means, in conjunction with gear means, to effect the several movements of the workpiece, synchronized with the hydraulically-operated means of the milling machine provided to effect reciprocation of the milling machine table (which table is, of course, not the carrier to which reference has been made), particularly safe workpiece-operating means, which means is not apt to cause injury to the operator; workpiece-operating means, which is not complicated nor likely to get out of order; and means which may be readily attached to a conventional milling machine table, disposed below a non-reciprocating rotary cutter with its axis of rotation substantially normal to the path of reciprocation of the table.

Other objects and advantages of the invention will be apparent during the course of the following detailed description of the invention, taken in connection with the accompanying drawings, forming a part of this disclosure, and in which drawings:

Figure 1 is a top plan of the new milling fixture disposed upon a milling machine shown in fragmentary top plan.

Figure 2 is a vertical section of the new fixture, substantially on the line 2—2 of Figure 1.

Figure 3 is an elevation of one of a pair of gear trains employed with the novel fixture.

Figure 4 is a vertical transverse section of a portion of the milling fixture substantially on the line 4—4 of Figure 2.

Figure 5:
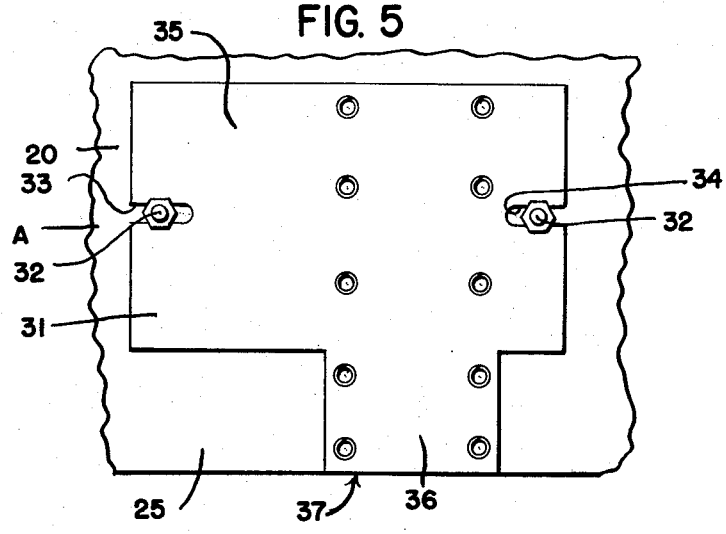
Figure 5 is a top plan of one of a pair of base plates for the new fixture.

In the drawings, wherein for the purpose of illustration is shown a preferred embodiment of the invention and wherein similar reference characters designate corresponding parts throughout the several views, the letter A designates a conventional milling machine, B designates, generally, the novel milling fixture, and C a milled workpiece.

The milling machine A may be, for example, the so-called plain milling machine described and illustrated in the Operator's Instruction Book of the Cincinnati Hydromatic Milling Machines, Publication No. M–1403, copyrighted 1945 by The Cincinnati Milling Machine Co., Cincinnati 9, Ohio. The milling machine A includes a substantially horizontally-reciprocating table 20, hydraulic drive means 21 to (1) move the table in order to position a workpiece mounted thereon to be milled by a longitudinally non-reciprocating or advancing rotary cutter 22, (2) to retain the table stationary during milling, and (3) to then move the milled workpiece C away from the cutter 22. The table 20 has an operator-facing side edge 23, a central portion 24, and end portions 25. A hydraulic drive means applicable is embodied in U. S. Patents 1,558,002, dated October 20, 1925; 1,619,200, dated March 1, 1927; and 1,628,603, dated May 10, 1927, granted to Walter Ferris. The cutter 22 may be one constructed and arranged to mill drop-forged auger bits the entire length of their crimps.

Referring mainly to Figures 1 and 5, the novel milling fixture B includes a pair of milling fixture assemblies 30, each including a base plate 31 and each adjustably and detachably secured to the table 20 at the end portions 25 thereof as by bolt and nut assemblies 32 with the shanks thereof extending through slots 33 and 34 in the base plates 31 and through suitable perforations in the table 20. Each base plate 31 has a prime mover mounting portion 35, carriage-mounting portion 36, and an operator-facing edge 37.

Each base plate 31 mounts a pair of longitudinally-extending, spaced-apart, paralleling gibs 38, best shown in Figure 4, with upper faces 39 and inner sloping faces 40 extending downwardly and inwardly from the faces 36. These gibs 38 may be secured to their base plates 31 in any approved way, as by conventional Allen bolts, with the faces 40 confronting one another and the faces 39 in substantially the same horizontal plane. Each pair of gibs 38 provide a carriage-mounting portion 36.

Reciprocably mounted upon the portion 36 to slide longitudinally over the faces 39 is a carriage 41 having an upper or outer face 42, and a bottom or under face 43, with a groove 44 extending longitudinally of the face 43. At the operator-facing end portion 45 of the carriage there is provided an arcuate nut head-accommodating recess 46 (shown in Figure 2) extending inwardly from the operator-facing edge 47 of the carriage, and the walls of the groove 44 at this end 45 are provided with partial screw threads 48 to accommodate the screw threads of a bolt 55 to be subsequently described.

Secured to the carriage 41, as by Allen bolts, and depending from the bottom face 43 are a pair of gibs 49 having sloping faces 50 adapted to slide along the faces 40 of the gibs 38 (Figure 4). These gibs 49 are, preferably, slightly less in height than the gibs 38 and are provided in the upper ends of their operator-facing end portions 51, with a partial arcuate recess to accommodate a portion of the head of the bolt 55 to be next described, and which recess aligns with the arcuate recess 46.

The carriage reciprocating means 54 includes an exteriorly and interiorly screw threaded bolt 55, having a head accommodated within the partial arcuate recesses mentioned, and a shank with its screw threads engaging those of the screw threads 48. The interior screw threads (preferably square) of the bolt 55, which extend through the bolt from end to end, engage the threads (preferably square) of a lead screw 56. Rotation of the lead screw 56 in one direction will cause the carriage 41 to slide longitudinally of the base plate 31 in one direction and rotation in the other direction will cause sliding of the carriage in the opposite direction.

Each carriage 41 carries (as may be seen in Fig. 2) a workpiece-supporting structure which includes a head-stock 57 and elongated cradle or support 58 disposed at one or the forward end upon the head-stock and disposed, at the other or rear end, upon a leg 59. The head stock 56 is secured to the operator-facing end portion 45 of the carriage 41 in any approved way to extend upwardly from the face 42 and is provided with a driver shank-accommodating circular bore 60 extending from its operator-facing face 61 and extending to a driver head-accommodating circular recess 62 opening into the headstock's opposite face.

Rearwardly of the leg 58 is a tail-stock 63 forming part of the workpiece-supporting structure and preferably directly mounted upon an adjusting plate 64. The tail stock 63 comprises a socketed table stock center 65 reciprocable in a recessed body 66, which may be provided with a closure 67 for the recess 68 in the body 66, and an expansion spiral spring 69 within the recess 68, one end of which spring may bear against the inner face of the closure 67 and the other end against the inner end of the center 65 which extends into the recess. The center 65 has a workpiece accommodating, outwardly-extending socket 70 and a stop 71, as a peripheral flange, at its inner end within the recess 68. Of course, the spring 69 urges the center outwardly, limited by the stop 71. The adjusting plate 64 is mounted upon the carriage 41 and may be provided with suitable means to adjustably retain it thereon. This means may be the walls of parallel slots 72 (Figure 1) in the plate 64 into which extend upwardly-projecting, screw threaded screws 73 carried by the carriage 41, and provided with suitable heads.

Means 76 for rotating the lead screw 56 of the carriage reciprocating means 54 and means 77 for rotating the workpiece are contained mostly in a suitable gear box 78, best shown in Figure 3, for each milling assembly 30. The gear boxes 78 may be mounted upon the base plates 31 by connecting brackets 79 (Figure 2) at their operator facing end portions. Each gear box includes substantially parallel side walls 80 and 81, with the walls 80 also providing closures, if desired.

The gear train within each gear box 78 includes (as is best shown in Fig. 3) a small gear wheel 82 mounted upon the end portion of the lead screw 56 which extends through a suitable bushing 83 in the wall 81, through the gear box, preferably thru the wall 80 and outwardly thereof. The teeth of this wheel 82 mesh with those of a second gear wheel 84 rotatable with a third and longer diametered gear wheel 85, the teeth of which mesh with those of a fourth gear wheel 86 mounted upon a shaft carrying a fifth or smaller gear wheel 87 the teeth of which mesh with those of a sixth or longer diametered gear wheel 88 mounted upon the elongated shank 89 of a bit driver 90 which extends thru the wall 81 and the bore 60 and has a socketed driver head 91 which rotates in the recess 62 in the head stock 57. The teeth of the wheel 85 also mesh with those of a seventh or large-diametered gear wheel 92, the teeth of which mesh with those of an eighth or small-diametered gear wheel 93 mounted upon a shaft 94 which also carries a ninth or large-diametered gear wheel 95, the teeth of which mesh with those of a tenth or large-diametered gear wheel 96 mounted upon an adjustable bracket arm 97 and with its teeth meshing with those of a eleventh or small-diametered gear wheel 98 mounted (keyed) upon a shaft 119 operatively connected with an electric motor 116 to be subsequently described.

Associated with the gear wheels 87 and 88 is a means to permit substitution of gear wheels of various sizes. This means includes an adjustment arm 99 with the wheel 82 pivotally carried by one end portion, the arm 99, in turn, pivotally carried on the spindle 100 for the wheels 86 and 87, with a retaining nut 101 on the screw threaded free end of the spindle 100. This extends through a longitudinally extending slot 102 in the arm 99. At the end of the arm 99 opposite its gear wheel-carrying end is a preferably arcuate arm 103, extending to either side of the arm 99 and having an arcuate slot 104 into which extends a screw-threaded shank 105 carried by the wall 81 and provided with a nut 106 for clamping the arm 103 against movement, after the arm has been adjusted as is now obvious. By loosening the nuts 101 and 105, the arm 99 and arm 103 connected therewith may be removed and another sized gear wheel substituted for the wheel 87. Other substitutions may also be made and the slot 102 permits adjustment of the arm 99, as is also obvious.

A keeper arm 106ª pivotally carried at one end as at 107 by the wall 81 has a U-slot 108 adapted to extend over the shank 89 and may be raised to remove the wheel 88 for substitution of a wheel of different diameter if desired, the wheel (or a different-diametered one) being keyed to the shank 89 by an elongated keyway in the shank 89, carrying a suitable key.

Means to permit substitution of gear wheels of selected size for the wheel 96 may be provided and preferably includes the bracket arm 97 (which is longitudinally slotted as at 109 so it may be moved longitudinally, guided by a screw-threaded spindle 110 for the wheel 96, with a nut 111 for the spindle 110 and adapted to clamp the spindle in adjusted positions longitudinally of the slot 109). The arm 97 is pivoted at one end portion at the axis of the shaft referred to and at its other end portion is linked to one end portion of a second arm 112, provided with a longitudinally-extending slot 113 in which extends a screw threaded stub 114 carrying a nut for clamping the arm 112 in various positions, as is not apparent.

Since the bit driver shanks 89 reciprocate with the carriages 41, they extend through the gear boxes 78 and outwardly thereof for a distance somewhat greater than the travel distance in one direction, of each carriage.

Each gear train in each gear box 78 is shown, for example, as in Figure 1, as operated by suitable prime mover means 115, comprising a conventional reversible electric motor 116, operatively connected, through conventional clutch means 117 and 118 with shaft 119 upon which gear wheel 98 is mounted. The motors 116 are mounted upon the portions 35 of the base plates 31 to reciprocate with the table 20.

In order to effect quick release of a milled workpiece C, there may be provided an arm 120 (Figs. 1 and 4) pivotally mounted intermediate its end portions upon a bracket 121 carried by the body 66 and with one end portion projecting outwardly to be contacted by the operator's hand while the other end portion engages the tail stock center 65 and is adapted to press it into the body 66 against the resistance of the spring 69 thus releasing the workpiece from the socket of the tail stock center.

In the centered portion 24 of the table 20, in the space between the two spaced-apart base plates 31, may be mounted a suitable tray 122 to be carried by the table 20 and receive completed workpiece C or the like.

Various electric switch means are required to effect operation of the motors 116, synchronized with the reciprocation of the table 20. That is, as the conventional hydraulic drive means 21 has moved the table 20 (for example to the left in Fig. 1) into position so that a workpiece, disposed on the cradle 58 and retained by the socketed driver head 91 and tail stock center 65 as shown in Fig. 2, is in position to be milled by the rotating cutter 22, beginning with the end portion of the workpiece retained by the tail stock center 65, the table will stop and the associated motor 116 (the right-hand motor of Fig. 1) will be energized to commence rotation of its shaft in one direction to simultaneously advance the associated carriage 41, by rotation of the lead screw 56, and rotate the workpiece, by rotation of the bit driver 90. This may be effected by a conventional switch 125 carried by a stationary portion of the milling machine A and disposed so that its normally-open (as being held open by an expansion spiral spring, well known in the art), switch arm 126 is in the path of travel of a projection 127 carried by the table 20. As the projection 127 engages the arm 126 continued movement of the table 20 will cause the projection to move the arm 126 and close the switch so as to cause energization of the motor 116 (the right hand motor in Fig. 1).

As the table comes to rest (controlled by the means 21), the carriage 41 will now move away from the operator (will advance) and the cutter 22 will mill the rotating workpiece.

When milling of this workpiece is completed, the hydraulic means 21 will cause the table 20 to start movement toward its original position, and release of the projection 127 upon the switch arm 126 will open the switch 125. Simultaneously the limit of advance of the carriage will have caused a suitable longitudinally-adjustable projection 128 carried by the carriage to engage and move a switch arm of a conventional reversing electric switch 129 to disenergize, reverse and reenergize the motor 116. This will cause the carriage 41 associated therewith to retract to its original position as the table reaches its original position, and the operator manipulates the switch 129 to deenergize the motor and reverse it. He removes the milled workpiece C employing the arm 20, and replaces it with a second workpiece. During this sequence, he has placed a third workpiece in the other cradle 58 (as the left hand cradle in Fig. 1) and retained in the other socketed drive head 91 and tail stock center 65.

The table 20, actuated by the drive means 21, now brings movement in the opposite direction until the third workpiece is in position to be milled by the rotating cutter 22 as was the first workpiece. However, the arm 130 of an electric switch 131, similar to the switch 125 but spaced therefrom as in Fig. 1, is contacted by a suitable projection 132 carried by the table 20 and moved to close the switch 131, whereupon the second motor 116 will be energized and the third workpiece will be milled, as was the first. Again, when milling is completed and the table commences movement again, release of the projection 132 will cause the switch arm 130 to open the switch 131. Simultaneously, the limit of advance of the carriage will have caused a second projection 134 (similar to the projection 128) carried thereby to engage and move the switch arm of a second reverse switch 135 to cause disenergization, reversal and re-energization of the second motor 116 (the left-hand motor in Fig. 1) and the second carriage, carrying the third workpiece, to retract. The subsequent steps are clear from the sequence of steps described for the milling of the first workpiece and movement by the table.

Figure 6:
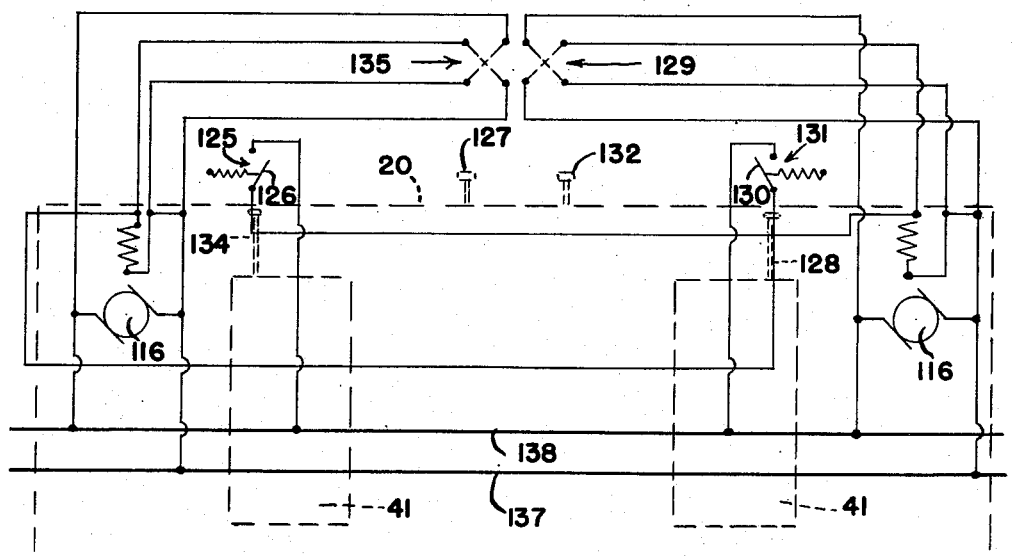
Figure 6 is a wiring diagram for the new fixture.

In the wiring diagram, Figure 6, which includes only wiring for the operation of the motors 116, the main conductors are 136 and 137. I claim no novelty for the wiring arrangement.

From the foregoing it is clear that with the compact arrangement of the milling fixture B as shown, one operator may attend the machine, positioned facing the cutter 22.

The gear boxes 78 are disposed quite low and the axes of rotation of the bit driver shanks 89 are high with reference to the gear boxes so that the gear boxes are not in the way when removing milled workpieces and replacing them with workpieces to be milled, which latter operation is effected while another workpiece is being milled.

Various changes may be made to the form of invention herein shown and described without departing from the spirit of the invention or the scope of the claims.

What is claimed is:

1. In a milling fixture for a milling machine, workpiece moving means, including a reciprocating and rotating bit driver having a socketed driver head for one end of the workpiece and an elongated cylindrical shank provided with an elongated longitudinally-extending keyway, a first spur gear keyed to said shank, means releasably retaining said gear against reciprocation in planes normal to its axis of rotation, a second spur gear, means for selectively moving said second spur gear into and out of mesh with said first spur gear; reciprocating means for reciprocating said bit driver when one end of a workpiece is held thereby and the other end is held by said reciprocating means, including a reciprocating member, reciprocable in a path paralleling the path of reciprocation of said bit driver, said reciprocating member being provided with a bearing for said driver head and a rotating socketed portion for the other end of said workpiece, an elongated lead screw operatively connected with said reciprocating member with its axis of rotation substantially paralleling the axis of rotation of said bit driver, and a third spur gear fixedly mounted upon said lead screw; a fourth spur gear; and means operatively connecting said second, third and fourth spur gears to rotate in unison.

2. In a milling fixture for a milling machine, workpiece moving means, including a reciprocating and rotating bit driver having a socketed driver head for one end of the workpiece and an elongated cylindrical shank provided with an elongated longitudinally extending keyway, a first spur gear keyed to said shank, means releasably retaining said gear against reciprocation in planes normal to its axis of rotation, a second spur gear, means for selectively moving said second spur gear into and out of mesh with said first spur gear; reciprocating means for reciprocating said bit driver when one end of a workpiece is held thereby and the other end is held by said reciprocating means, including a reciprocating member, reciprocable in a path paralleling the path of reciprocation of said bit driver, said reciprocating member being provided with a bearing for said driver head and a rotating socketed portion for the other end of said workpiece, an elongated lead screw provided with an end portion operatively connected with said reciprocating member with its axis of rotation substantially paralleling the axis of rotation of said bit driver, and a third spur gear fixedly mounted upon said lead screw; a fourth spur gear; and means operatively connecting said second, third and fourth spur gears to rotate in unison, including an arm having one end loosely pivoted to said end portion and a shaft fixedly mounting said second and fourth gears.

3. In a milling fixture for a milling machine, workpiece moving means, including a reciprocating and rotating bit driver having a socketed driver head for one end of the workpiece and an elongated cylindrical shank provided with an elongated longitudinally-extending keyway, a first spur gear keyed to said shank, means releasably retaining said gear against reciprocation in planes normal to its axis of rotation, a second spur gear, means for selectively moving said second spur gear into and out of mesh with said first gear; reciprocating means for reciprocating said bit driver when one end of a workpiece is held thereby and the other end is held by said reciprocating means, including a reciprocating member, reciprocable in a path paralleling the path of reciprocation of said bit driver, said reciprocating member being provided with a bearing for said driver head and a rotating socketed portion for the other end of said workpiece, an elongated lead screw provided with an end portion operatively connected with said reciprocating member with its axis of rotation substantially paralleling the axis of rotation of said bit driver, and a third spur gear fixedly mounted upon said lead screw; a fourth spur gear; and means operatively connecting said second, third and fourth gears to rotate in unison, including an adjustment arm having one end loosely pivoted to said end portion, and a shaft fixedly mounting said second and fourth gears.

4. In a milling fixture for a milling machine, workpiece moving means, including a reciprocating and rotating bit driver having a socketed driver head for one end of the workpiece and an elongated cylindrical shank provided with an elongated longitudinally-extending keyway, a first spur gear keyed to said shank, means releasably retaining said gear against reciprocation in planes normal to its axis of rotation, a second spur gear, means for selectively moving said second spur gear into and out of mesh with said first spur gear; reciprocating means for reciprocating said bit driver when one end of a workpiece is held thereby and the other end is held by said reciprocating means, including a reciprocating member, reciprocable in a path paralleling the path of reciprocation of said bit driver, said reciprocating member being provided with a bearing for said driver head and a rotating socketed portion for the other end of said workpiece, an elongated lead screw provided with an end portion operatively connected with said reciprocating member with its axis of rotation substantially paralleling the axis of rotation of said bit driver, and a third spur gear fixedly mounted upon said lead screw; a fourth spur gear; and means operatively connecting said second, third and fourth gears to rotate in unison, including an adjustment arm having one end loosely pivoted to said end portion, a second arm secured to the first arm and provided with an arcuate slot with it longitudinal axis radial to the axis of rotation of said lead screw, and means for releasably clamping said second arm against movement comprising a support, a set screw with a portion thereof within said slot, a second portion thereof bearing against said second arm and a third portion thereof carried by said support.

5. In a milling fixture for a milling machine, workpiece moving means, including a reciprocating and rotating bit driver having a socketed driver head for one end of the workpiece and an elongated cylindrical shank provided with an elongated longitudinally-extending keyway, a first spur gear keyed to said shank, means releasably retaining said gear against reciprocation in planes normal to its axis of rotation, comprising a fixed support, a keeper arm pivoted at one end to said support and provided with a slot with a portion of said shank within said slot, said gear having one face facing said support and being between said support and said keeper arm and a second face opposite said one face, a portion of said keeper arm being normally disposed in facing relationship with said second face of said gear, a second spur gear, means for selectively moving said second spur gear into and out of mesh with said first spur gear; reciprocating means for reciprocating said bit driver when one end of a workpiece is held thereby and the other end is held by said reciprocating means, including a reciprocating member, reciprocable in a path paralleling the path of reciprocation of said bit driver, said reciprocating member being provided with a bearing for said driver head and a rotating socketed portion for the other end of said workpiece, an elongated lead screw operatively connected with said reciprocating member with its axis of rotation substantially paralleling the axis of rotation of said bit driver, and a third spur gear fixedly mounted upon said lead screw; a fourth spur gear; and means operatively connecting said second, third and fourth spur gears to rotate in unison.

6. In a milling fixture for a milling machine, workpiece moving means, including a reciprocating and rotating bit driver having a socketed driver head for one end of the workpiece and an elongated cylindrical shank provided with an elongated longitudinally-extending keyway, a first spur gear keyed to said shank, means releasably retaining said gear against reciprocation in planes normal to its axis of rotation, a second spur gear, means for selectively moving said second spur gear into and out of mesh with said first spur gear; reciprocating means for reciprocating said bit driver when one end of a workpiece is held thereby and the other end is held by said reciprocating means, including a reciprocating member, reciprocable in a path paralleling the path of reciprocation of said bit driver, said reciprocating member being provided with a bearing for said driver head and a rotating socketed portion for the other end of said workpiece, a body having a recess receiving one part of said rotating socketed portion, and an expansion spring in the recess of said body bearing at one end against a wall of said recessed body and bearing at its other end against said socketed portion, an elongated lead screw operatively connected with said reciprocating member with its axis of rotation substantially paralleling the axis of rotation of said bit driver, and a third spur gear fixedly mounted upon said lead screw; a fourth spur gear; and means operatively connecting said second, third and fourth spur gears to rotate in unison.

7. In a workpiece milling machine of the class having a rotating and non-reciprocating cutter, a reciprocating table movable in a path substantially normal to the longitudinal axis of said cutter, and means to stop temporarily the reciprocatory movement of said table upon completion of said movement in one reciprocating direction, the improvement which comprises a fixture including a reciprocating carriage carried by the table; a workpiece holder rotatably carried by the carriage; electro-mechanical means to rotate automatically said holder in either direction including a reversing electric motor; means, actuated upon temporary stoppage of said table upon completion of said movement in said one direction, to move automatically said carriage transversely of the table in a first reciprocatory direction parallel with the longitudinal axis of said cutter, with said axis and the axis of rotation of said holder substantially parallel and with said cutter disposed in cutting relationship with a workpiece held by said holder, and to move automatically said carriage in a second reciprocatory direction upon completion of movement of said carriage in said first direction; said electro-mechanical means including means to commence rotation of said holder in one direction upon start of movement of said carriage in said first direction and to continue said rotation of said holder during movement of said carriage in said first direction; electro-mechanical means synchronized with the completion of movement of said carriage in said first direction to cause the first-named electro-mechanical means to commence rotation of said holder in said one direction, to reverse rotation of said holder upon completion of said movement of said carriage in said first direction, and to cause discontinuance of rotation of said holder when said carriage has completed movement in said second direction; and means to reverse said motor upon completion of movement of said carriage in said second direction.

8. In a workpiece milling machine of the class having a rotating and non-reciprocating cutter, a reciprocating table movable in a path substantially normal to the longitudinal axis of said cutter, and means to stop temporarily the reciprocatory movement of said table upon completion of said movement in one reciprocating direction, the improvement which comprises a fixture including a reciprocating carriage carried by the table; a workpiece holder rotatably carried by the carriage; electro-mechanical means to rotate automatically said holder in either direction including a reversing electric motor; means, actuated upon temporary stoppage of said table upon completion of said movement in said one direction, to move automatically said carriage transversely of the table in a first reciprocatory direction parallel with the longitudinal axis of said cutter, with said axis and the axis of rotation of said holder substantially parallel and with said cutter disposed in cutting relationship with a workpiece held by said holder, and to move automatically said carriage in a second reciprocatory direction upon completion of movement of said carriage in said first direction; said electro-mechanical means including means to commence rotation of said holder in one direction upon start of movement of said carriage in said first direction and to continue said rotation of said holder during movement of said carriage in said first direction; means actuated upon the completion of movement of said carriage in said first direction to cause said electro-mechanical means to commence rotation of said holder in said one direction, to reverse rotation of said holder upon completion of said movement of said carriage in said first direction, and to cause discontinuance of rotation of said holder when said carriage has completed movement in said second direction; and manually actuated means to reverse said motor upon completion of movement of said carriage in said second direction.

9. In a workpiece milling machine of the class having a rotating and non-reciprocating cutter, a reciprocating table movable in a path substantially normal to the longitudinal axis of said cutter, and means to stop temporarily the reciprocatory movement of said table upon completion of said movement in one reciprocating direction, the improvement which comprises a fixture including a reciprocating carriage carried by the table; a workpiece holder rotatably carried by the carriage; electro-mechanical means to rotate automatically said holder in either direction including a reversing electric motor; means, actuated upon temporary stoppage of said table upon completion of said movement in said one direction, including a gear train carried by said reciprocating table, said gear train forming a part of said electro-mechanical means, to move automatically said carriage transversely of the table in a first reciprocatory direction parallel with the longitudinal axis of said cutter, with said axis and the axis of rotation of said holder substantially parallel and with said cutter disposed in cutting relationship with a workpiece held by said holder, and to move automatically said carriage in a second reciprocatory direction upon completion of movement of said carriage in said first direction; said electro-mechanical means including means to commence rotation of said holder in one direction upon start of movement of said carriage in said first direction and to continue said rotation of said holder during movement of said carriage in said first direction; means actuated upon the completion of movement of said carriage in said first direction to cause said electro-mechanical means to commence rotation of said holder in said one direction, to reverse rotation of said holder upon completion of said movement of said carriage in said first direction, and to cause discontinuance of rotation of said holder when said carriage has completed movement in said second direction; and manually-actuated means to reverse said motor upon completion of movement of said carriage in said second direction.

RICHARD C. LACY.

References Cited in the file of this patent

UNITED STATES PATENTS

| Number | Name | Date |
|---|---|---|
| 994,386 | Gustavson | June 6, 1911 |
| 1,004,619 | Berold | Oct. 3, 1911 |
| 1,224,945 | McPherson | May 8, 1917 |
| 1,454,181 | Muller | May 8, 1923 |
| 1,598,703 | Berthon | Sept. 7, 1926 |
| 1,684,310 | Eisenberg | Sept. 11, 1928 |
| 1,843,345 | Sundstrand | Feb. 2, 1932 |
| 2,405,485 | Barkstrom et al. | Aug. 6, 1946 |
| 2,405,522 | Schurr | Aug. 6, 1946 |
| 2,501,281 | Longstreet | Mar. 21, 1950 |